(12) United States Patent
Widlroither et al.

(10) Patent No.: US 10,934,666 B2
(45) Date of Patent: Mar. 2, 2021

(54) SCREWING MACHINE

(71) Applicant: ROBEL BAHNBAUMASCHINEN GMBH, Freilassing (DE)

(72) Inventors: Otto Widlroither, Freilassing (DE); Dieter Kamml, Ainring (DE)

(73) Assignee: Robel Bahnbaumaschinen GmbH, Freilassing (DE)

( * ) Notice: Subject to any disclaimer, the term of this patent is extended or adjusted under 35 U.S.C. 154(b) by 246 days.

(21) Appl. No.: 16/067,618

(22) PCT Filed: Dec. 22, 2016

(86) PCT No.: PCT/EP2016/002170
§ 371 (c)(1),
(2) Date: Jul. 2, 2018

(87) PCT Pub. No.: WO2017/129213
PCT Pub. Date: Aug. 3, 2017

(65) Prior Publication Data
US 2019/0003131 A1    Jan. 3, 2019

(30) Foreign Application Priority Data
Jan. 29, 2016    (DE) ...................... 10 2016 000 968.3

(51) Int. Cl.
*E01B 29/28*    (2006.01)
*B23P 19/06*    (2006.01)

(52) U.S. Cl.
CPC .............. *E01B 29/28* (2013.01); *B23P 19/06* (2013.01); *B23P 19/065* (2013.01); *E01B 2201/04* (2013.01)

(58) Field of Classification Search
CPC .......... E01B 29/00; E01B 29/24; E01B 29/26; E01B 29/28
See application file for complete search history.

(56) References Cited

U.S. PATENT DOCUMENTS

| 4,215,636 A | 8/1980 | Smith |
| 4,813,312 A | 3/1989 | Wilhelm |

FOREIGN PATENT DOCUMENTS

| AU | 2011267433 B2 | 10/2014 | |
| CN | 2681860 Y | 3/2005 | |
| CN | 202577075 U | 12/2012 | |
| DE | 4414886 A1 * | 11/1995 | ........... B25B 21/002 |

(Continued)

*Primary Examiner* — Robert J McCarry, Jr.
(74) *Attorney, Agent, or Firm* — Laurence A. Greenberg; Werner H. Stemer; Ralph E. Locher

(57) ABSTRACT

A screwing machine tightens or releases rail fixing screws. The screwing machine contains a machine frame which can be rolled on a track, handles for moving the screwing machine, a motor for applying a torque to a screw head, and a device for transmitting a torque. A measuring device is provided opposite the machine frame in order to detect a reaction torque of the motor. The motor is actuated in order to limit the torque depending on the reaction torque. The reaction torque is used as a reference variable. The reaction torque is applied to the machine frame by the motor and is ascertainable with a high degree of precision by a simple measuring device. In this manner, a simple and robust design and a precise rotational speed limiting function are implemented.

13 Claims, 1 Drawing Sheet

(56) References Cited

FOREIGN PATENT DOCUMENTS

| | | | |
|---|---|---|---|
| DE | 4414886 A1 | 11/1995 | |
| DE | 102010023798 A1 * | 12/2011 | ............. E01B 29/28 |
| DE | 102010023798 A1 | 12/2011 | |
| EP | 0249659 A2 | 12/1987 | |
| FR | 2349401 A3 | 11/1977 | |
| JP | S5280683 U | 6/1977 | |
| JP | S6296539 U | 6/1987 | |
| JP | H05148810 A | 6/1993 | |
| JP | 2002292577 A | 10/2002 | |
| JP | 2014015733 A | 1/2014 | |
| WO | 2006058552 A1 | 6/2006 | |

* cited by examiner

SCREWING MACHINE

FIELD OF TECHNOLOGY

The invention concerns a screwing machine for tightening or loosening rail fitting screws with a machine frame that can be rolled along a track, with handles for shunting and with a motor for applying torque to a screw head as well as with a means for torque limitation. The invention further concerns a method for operating the screwing machine.

BACKGROUND OF THE INVENTION

Field of the Invention

A screwing machine that comprises a servo screwdriver for applying a limited torque is known from DE 10 2010 023 798 A1. A processor equipped with data storage is connected with a rotation angle measuring device as well as with a torque transmitter for providing a target torque with which a screw connection is to be tightened.

With such a servo screwdriver a torque measuring shaft is integrated directly into a spindle of the screwdriver. This necessitates complex mounting and lengthens the spindle, which renders the constructive assembly of the screwing machine more complex. A servo screwdriver is also susceptible to mechanical damage.

WO 2006/058552 A1 discloses a mechanical screwing machine, wherein a torque limitation can be set by means of an electromagnetic switchable friction clutch. Inaccuracies that are not negligible occur due to the wear and inertia of the mechanical components.

A screwing machine with an alternative drive system is known from DE 44 14 886 A1. A hydraulic drive is envisaged in addition to a mechanical drive for tightening a pre-screwed screw connection with a defined torque. A hydraulic pressure is used as reference for a tightening torque here. Inaccuracies are caused by the existing temperature- and viscosity dependency.

SUMMARY OF THE INVENTION

The invention is based on the task of providing an improvement for a screwing machine of the type mentioned above compared to prior art. A simple construction and high accuracy are in particular intended. A corresponding method is also to be disclosed.

This task is solved according to the invention by a screwing machine according to the independent apparatus claim and a method according to the independent method claim. Dependent claims disclose advantageous designs of the invention.

Specifically a measuring means for recording a reaction moment of the motor in relation to the machine frame is arranged, wherein the motor is controlled for limiting the torque depending on the reaction moment. The reaction moment that acts from the motor on the machine frame and can be determined with high accuracy by means of a simple measuring means is used as a reference parameter. In this way a simple and robust construction is realised on the one hand, and precise rotation speed limitation on the other.

In an advantageous design of the invention the measuring means comprises a load cell for measuring a force acting on the motor. It is not the reaction moment that is measured directly here, but a force that is applied by the machine frame to the motor. The force here prevents a movement of the motor in relation to the machine frame. A proportional relationship that is clearly defined by the geometry of an existing motor suspension exists between the force and the reaction moment.

The motor is conveniently a hydraulic motor or an electric motor, making it possible to use a high torque with a small frame size. Thanks to its robust, low maintenance construction a hydraulic motor is also very suitable for the demanding conditions of track construction sites. An electric motor is also easy to regulate and enables the operation of the screwing machine by means of an accumulator as an electric machine or a hybrid machine. These advantages are combined with a very precise torque limitation according to the present invention.

A simple advantageous construction of the screwing machine is characterised in that a controller is envisaged, which is supplied with a measurement value proportional to the reaction moment, and in that this control is set up for controlling the motor depending on the measurement value.

It is further of advantage if the screw head is rotationally locked to a drive shaft of the motor. Transmission means such as clutches or gears are not envisaged between these two components, which ensures a direct and loss-free torque transmission between motor and screw head. The absence of damping or elastic transmission means effects that the torque that can be applied to a screw by means of the screw head can be deduced from the reaction moment of the motor with high accuracy.

In an advantageous design the motor is mounted on the machine frame for rotation around a predetermined axis. The resulting reaction moment can be easily determined by means of this predetermined axis.

It is of advantage here if the motor is mounted for rotation around a shaft axis of the motor. In this way the motor and the screw head are rotatably arranged around the same axis. The motor is supported against rotation, wherein a supporting moment or a supporting force is measured for recording the reaction moment. Lever effects do not need to be taken into consideration and the reaction moment determined equals the torque to be applied by means of the screw head exactly with reverse sign.

The motor is conveniently mounted on the machine frame by means of a roller bearing. This rules out friction losses that might otherwise have to be considered for determining the torque to be limited.

A constructively simple assembly envisages that the motor is supported in relation to the machine frame by means of a torque support, and that the measuring means is designed for recording a support force applied by means of the torque support. The entire support force that blocks a rotation movement of the motor in relation to the machine frame acts in the torque support. In this way a single sensor will suffice for recording the reaction moment.

It is convenient for a compact construction of the screwing machine if the measuring means is integrated into the torque support. A pure traction or pressure force that can also be measured very precisely with a simple load cell also acts in a rod-like torque support, the ends of which are articulatedly mounted.

An alternative embodiment envisages that the motor is fitted to a receiving device of the machine frame and that the measuring means in particular is integrated into the receiving means. With a moveably mounted motor the latter is supported at least at one fitting point, wherein the measuring means measures a force acting at that fitting point. It can also be convenient to envisage a fixed fitting of the motor and to carry out force measurements at one fitting point or at several fitting points by means of the measuring means for recording the reaction moment of the motor in this way.

With the method according to the invention the torque is applied to the screw head by means of the motor, wherein the reaction moment of the motor in relation to the machine frame is recorded by means of the measuring means, and wherein the motor is controlled depending on the reaction moment for limiting the torque. The torque acting on the screw head can be easily set in this way, wherein the recorded reaction moment is used as a parameter for the actual torque that occurs.

It is of advantage here if, for recording the reaction moment, a measurement value for a force acting on the motor is measured by means of a load cell, if the measurement value is supplied to a controller, and if the controller controls the motor depending on the measurement value. A single measurement value is used for determining the reaction moment from the same. In this way control is possible with simple components and requires no complex calculation operations.

In a simple further development of the method the controller is provided with an adjustable limit value, wherein the motor is deactivated as soon as the measurement value reaches the limit value. The controller is not provided with a torque value, but for example with a maximum value for a force measured by the measuring means, wherein a known relationship exists between force and torque.

It is also of advantage if the controller provides a hydraulic pressure limitation valve with a limit value, if a hydraulic motor runs until it reaches the limit value, if the reaction moment recorded when the hydraulic motor is stopped is compared with a target moment, and if the controller provides an adjusted limit value depending on this comparison. The hydraulic motor is here iteratively controlled depending on the reaction moment. The torque actually applied during a tightening process of a rail fitting screw is determined by means of the reaction moment. If it deviates from a target value due to a temperature or viscosity change, the limit value for the next tightening process will be adjusted accordingly by the controller. In this way the reaction delay when stopping a hydraulic motor that would otherwise be objectionable in a control circuit is negligible.

BRIEF DESCRIPTION OF THE SEVERAL VIEWS OF THE DRAWING

The invention will now be described by way of an example with reference to the enclosed Figures. The schematic illustrations show.

DESCRIPTION OF THE INVENTION

Figure 1:
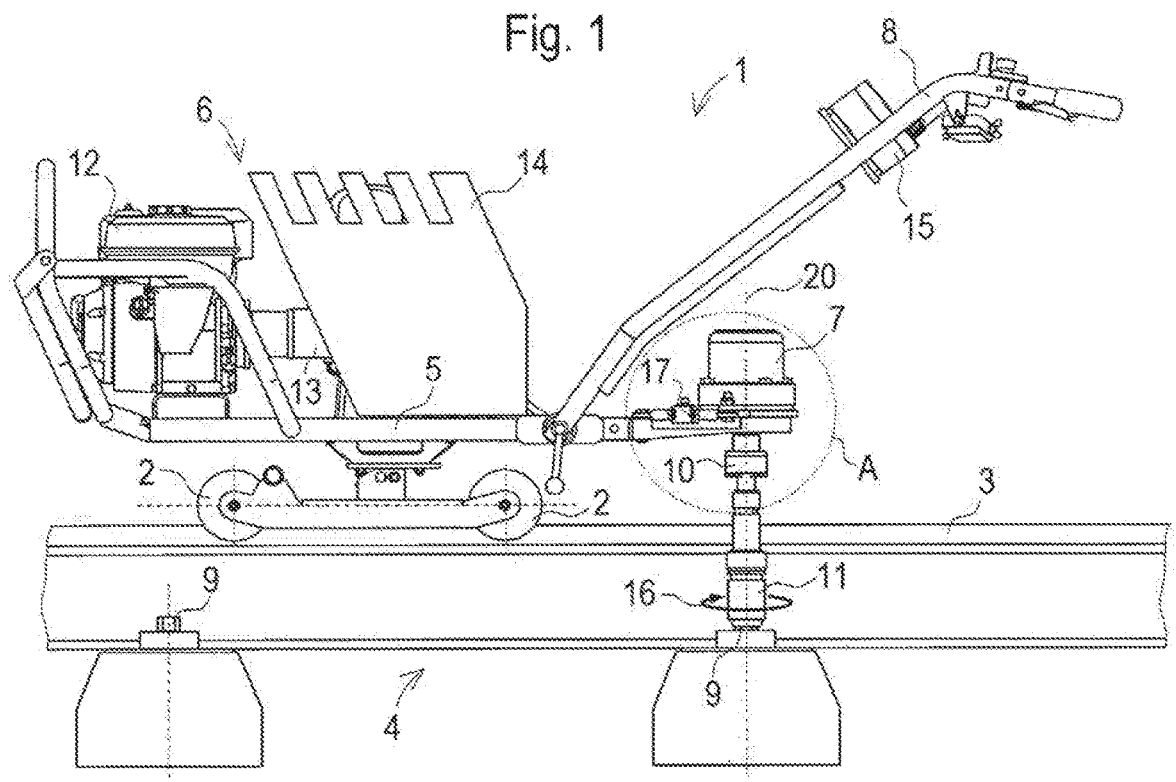
FIG. 1 screwing machine on a track
FIG. 2 diagonal view of detail A of the screwing machine
FIG. 3 plan view of detail A of the screwing machine

A screwing machine 1 illustrated in FIG. 1 comprises a machine frame 5, displaceable by means of rollers 2 on a rail 3 of a track 4. A hydraulic aggregate 6 for generating hydraulic pressure for supplying a motor 7 is fitted to the same. Handles 8 for shunting the screwing machine 1 are also connected with the machine frame 5. A screw head 11 that can be rotated by means of a drive shaft 10 is envisaged for tightening and loosening a rail fitting screw 9.

The hydraulic aggregate 6 comprises a combustion engine 12 and a hydraulic pump 13 and is shielded off from an operator by means of a fairing 14 in order to limit noise exposure. The motor 7 designed as a hydraulic motor is connected with the hydraulic aggregate 6 via hydraulic lines not illustrated here.

A controller 15 with operating elements and displays for setting a torque 16 to be applied is arranged in the area of the handles 8. The controller 15 is connected with the motor 7 or with control valves of the motor 7 via lines not illustrated here. Connection lines to the hydraulic aggregate 12 and to a measuring means 17 are also envisaged. The latter is integrated into a torque support 18 in the embodiment example.

Figure 2:
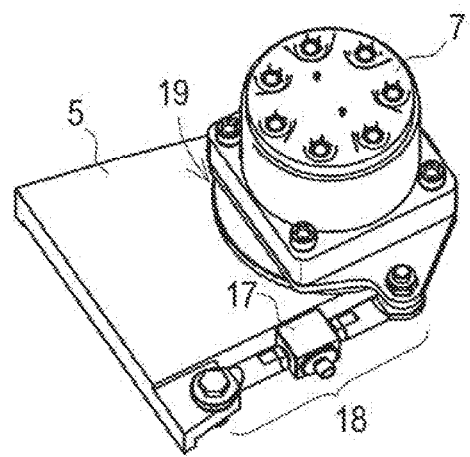
Figure 3:
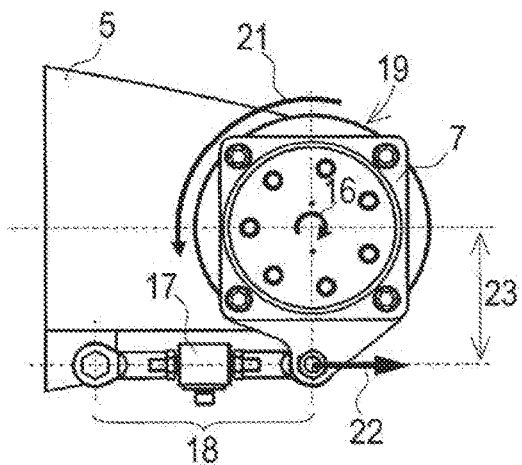

The functionality of the measuring means 17 will now be explained in detail with reference to FIGS. 2 and 3. The motor 7 is mounted for rotation around a shaft axis 20 in relation to the machine frame 5 by means of a roller bearing 19. As soon as the torque 16 is applied to the screw head 11 by means of the motor 7 a reaction moment 21 acts on the machine frame 5. Specifically this consists of a torsion moment in each case, occurring at both ends of the transmission line between motor 7 and screw head 11.

The reaction moment 21 is recorded by means of the measuring means 17, which for example comprises a load cell designed as a component of the rod-like torque support 18. Due to the support of the motor 7 by means of the torque support 18 a supporting force 22 acts in a longitudinal direction of the torque support 18. A multiplication of this support force 22 with a lever arm distance 23 equals the reaction moment 21. Torque 21 is limited simply and precisely in this way.

Specifically the control of the motor 7 designed as a hydraulic motor is realised in a way that the controller 15 provides a hydraulic pressure limitation valve with a limit value. In this way the hydraulic pressure is limited to a value that effects the torque 16 to be applied according to the specification of the hydraulic motor. As soon as the maximum pressure is reached and the hydraulic motor stops during a tightening process the reaction moment 21 recorded during the same is used for adjusting the limit value. If the torque 16 deduced from the recorded reaction moment 21 is for example too low, a higher limit value is provided for the pressure limitation valve for the next tightening process.

Also included in the invention are various other embodiments. An electric motor with a corresponding electrical supply can for example be envisaged instead of a hydraulic motor. A generator set is then arranged on the machine frame 5 instead of a hydraulic aggregate 6. The good controllability of the electric motor allows simplified motor control, wherein the measurement value measured by means of the measuring means 17 is supplied to the controller 15 and continuously compared with a limit value. The limit value here corresponds with the torque 16 provided, with which the rail fitting screw 9 is to be tightened.

The limit value can be adjusted infinitely or in line with a predetermined scale for adapting the screwing machine 1 to the relevant requirements. It may also be expedient to continuously compare the measurement value with a threshold value that is lower than the predetermined limit value. When this threshold value is reached the controller 15 reduces the rotation speed of the motor 7 in order to mask dynamic effects when applying maximum torque 16.

In a manifestation not illustrated here the motor 7 is fixed or moveably connected with a receiving device, wherein the measuring means 17 is integrated into the receiving device. It can also be envisaged here that the receiving device is moveably supported in relation to the machine frame 5 and that supporting forces or supporting moments acting on the receiving device are measured. The reaction moment 21 of the motor 7 can then be determined easily by means of a known geometry of the receiving device.

Supporting the motor 7 in relation to the machine frame 5 can be realised in many ways. It is crucial for the present invention here that a measurement value is measured or several measurement values are measured with the measuring means 18, from which the reaction moment 21 of the motor 7 can be determined via the geometry of the supporting arrangement.

The invention claimed is:

1. A screwing machine for tightening or loosening rail fitting screws, the screwing machine comprising:
   a machine frame that can be rolled along a track;
   handles for shunting;
   a motor rotatably mounted on said machine frame for rotation about a predetermined axis, said motor having a drive shaft and being configured for applying torque to a screw head and having means for torque limitation;
   wherein the screw head is connected with said drive shaft of said motor in a rotationally locked way and without a gear between said motor and said screw head; and
   a measuring device for recording a reaction moment of said motor in relation to said machine frame, said motor being controlled for limiting the torque depending on the reaction moment.

2. The screwing machine according to claim 1, wherein said measuring device has a load cell for measuring a force acting on said motor.

3. The screwing machine according to claim 1, wherein said motor is a hydraulic motor or an electric motor.

4. The screwing machine according to claim 1, further comprising a controller being supplied with a measurement value proportional to the reaction moment, said controller being equipped for controlling said motor depending on the measurement value.

5. The screwing machine according to claim 1, wherein said motor is mounted for rotation around a shaft axis of said motor.

6. The screwing machine according to claim 1, further comprising a roller bearing and said motor is mounted on said machine frame by means of said roller bearing.

7. The screwing machine according to claim 1,
   further comprising a torque support, said motor is supported in relation to said machine frame by means of said torque support; and
   wherein said measuring device is configured for recording a supporting force applied by means of said torque support.

8. The screwing machine according to claim 7, wherein said measuring device is integrated into said torque support.

9. The screwing machine according to claim 1, wherein:
   said machine frame has a receiving device;
   said motor is fitted to said receiving device of said machine frame; and
   said measuring device is integrated into said receiving device.

10. A method for operating a screwing machine for tightening or loosening rail fitting screws, the screwing machine having a machine frame that can be rolled along a track, handles for shunting, a motor for applying torque to a screw head and with means for torque limitation, wherein the motor has a drive shaft and the screw head is connected with the drive shaft of the motor in a rotationally locked way and without a gear between the motor and the screw head, and wherein the motor is rotatably mounted on the machine frame for rotation around a predetermined axis, and a measuring device for recording a reaction moment of the motor in relation to the machine frame, the motor being controlled for limiting the torque depending on the reaction moment, which method comprises the steps of:
    applying the torque to the screw head by means of the motor;
    recording the reaction moment of the motor in relation to the machine frame by means of the measuring device; and
    controlling the motor for limiting the torque depending on the reaction moment.

11. The method according to claim 10, wherein for recording the reaction moment, performing the further steps of:
    measuring a measurement value for a force acting on the motor by means of a load cell; and
    supplying the measurement value to a controller and the controller controlling the motor in dependence on the measurement value.

12. The method according to claim 11, which further comprises providing the controller with an adjustable limit value and in that the motor is deactivated as soon as the measurement value reaches the adjustable limit value.

13. The method according to claim 11, which comprises:
    providing the controller with a hydraulic pressure limitation valve with a limit value;
    running the motor, being a hydraulic motor, until the limit value is reached;
    comparing the reaction moment recorded when the hydraulic motor is stopped with a target moment; and
    providing, via the controller, an adjusted limit value in dependence on a comparison.

* * * * *